(12) United States Patent
Hadad

(10) Patent No.: US 9,446,866 B2
(45) Date of Patent: Sep. 20, 2016

(54) BAGGING MACHINE SUITABLE FOR ALL TYPES OF DRY AND WET GRAIN

(75) Inventor: Francisco Hadad, Santa Fe (AR)

(73) Assignee: FIBER-K Industrial S.A., Quito (EC)

( * ) Notice: Subject to any disclaimer, the term of this patent is extended or adjusted under 35 U.S.C. 154(b) by 0 days.

(21) Appl. No.: 14/346,977

(22) PCT Filed: Mar. 23, 2012

(86) PCT No.: PCT/EC2012/000020
§ 371 (c)(1),
(2), (4) Date: Mar. 25, 2014

(87) PCT Pub. No.: WO2013/044930
PCT Pub. Date: Apr. 4, 2013

(65) Prior Publication Data
US 2014/0230961 A1 Aug. 21, 2014

(30) Foreign Application Priority Data
Sep. 26, 2011 (AR) .............................. 20110103502

(51) Int. Cl.
*B65B 1/04* (2006.01)
*A01F 25/14* (2006.01)

(52) U.S. Cl.
CPC ................. *B65B 1/04* (2013.01); *A01F 25/14* (2013.01); *A01F 2025/145* (2013.01)

(58) Field of Classification Search
USPC ....... 110/101 R, 110; 141/10, 114, 231, 313, 141/314, 315, 316, 317; 414/526; 460/111, 460/114, 16, 20, 23; 56/14.1, 14.2, 14.5, 56/14.6, 16.4 A, 16.4 B, 16.4 C, 16.4 R, 202, 56/203
See application file for complete search history.

(56) References Cited

U.S. PATENT DOCUMENTS

| | | | | |
|---|---|---|---|---|
| 1,734,331 A | * | 11/1929 | Haggart, Jr. | 180/24.11 |
| 3,736,736 A | * | 6/1973 | Myers | 56/14.5 |
| 3,763,621 A | * | 10/1973 | Klein et al. | 53/439 |
| 4,068,455 A | * | 1/1978 | Zehrung et al. | 56/344 |
| 4,071,226 A | * | 1/1978 | Miller | 366/64 |
| 4,087,953 A | * | 5/1978 | Wilson et al. | 56/14.6 |
| 4,310,036 A | * | 1/1982 | Rasmussen et al. | 141/114 |

(Continued)

FOREIGN PATENT DOCUMENTS

| | | |
|---|---|---|
| DE | 19612053 | 10/1997 |
| DE | 19612053 A1 * | 10/1997 ............ A01D 43/08 |

(Continued)

*Primary Examiner* — Mark A Laurenzi
*Assistant Examiner* — Andrew Schmid
(74) *Attorney, Agent, or Firm* — Defillo & Associates, Inc.; Evelyn A. Defillo

(57) ABSTRACT

The invention relates to a machine formed by a grain-holding box containing a combination of two transverse plates, namely a front vertical plate that closes the box and another plate which is solidly connected to the front plate halfway along the length thereof, inclined at 45 degrees, projected forward and integrally welded to the structure of the machine. In addition, the running gear includes a back axle provided with a single shaft connected at the ends thereof to a pair of wheels, plus at least one crown wheel, and said at least one crown wheel is in turn linked by means of a transmission chain to at least one gear mounted on the ends of a control rod of an integral clutch device linked by another transmission chain to a hydraulic motor, with the actuation and control means thereof.

7 Claims, 6 Drawing Sheets

(56) References Cited

U.S. PATENT DOCUMENTS

| | | | | |
|---|---|---|---|---|
| 4,412,567 A * | 11/1983 | Kosters | | 141/114 |
| 4,484,606 A * | 11/1984 | Kosters | | 141/114 |
| 4,567,820 A * | 2/1986 | Munsell | | 100/65 |
| 4,669,950 A * | 6/1987 | St. Lawrence | | 414/810 |
| 4,672,794 A * | 6/1987 | Good | | 53/440 |
| 4,735,242 A * | 4/1988 | St. Clair | | 141/114 |
| 4,819,701 A * | 4/1989 | Thornton | | 141/231 |
| RE33,491 E * | 12/1990 | Johnson et al. | | 141/114 |
| 5,140,802 A * | 8/1992 | Inman et al. | | 53/459 |
| 5,154,543 A * | 10/1992 | Houck et al. | | 405/303 |
| 5,367,860 A * | 11/1994 | Cullen | | 53/576 |
| 5,396,753 A * | 3/1995 | Cullen | | 53/567 |
| 5,419,102 A * | 5/1995 | Inman et al. | | 53/567 |
| 5,680,821 A * | 10/1997 | Wright et al. | | 110/257 |
| 5,857,313 A * | 1/1999 | Cullen | | 53/567 |
| 5,878,552 A * | 3/1999 | Wingert | | 53/438 |
| 5,894,871 A * | 4/1999 | Greer | | 141/231 |
| 5,899,247 A * | 5/1999 | Cullen | | 141/313 |
| 6,129,499 A * | 10/2000 | Adams | | 414/505 |
| 6,237,309 B1 * | 5/2001 | DeMarco | | 53/502 |
| 6,263,649 B1 * | 7/2001 | Gross et al. | | 56/16.1 |
| 6,325,588 B1 * | 12/2001 | Nolin | | 414/526 |
| 6,443,194 B1 * | 9/2002 | Cullen | | 141/313 |
| RE38,020 E * | 3/2003 | Cullen | | 141/313 |
| 6,672,034 B1 * | 1/2004 | Wingert | | 53/436 |
| 6,694,711 B1 * | 2/2004 | Cullen | | 53/527 |
| 7,117,656 B2 * | 10/2006 | Cullen | | 53/459 |
| 7,237,576 B1 * | 7/2007 | Cullen | | 141/71 |
| 7,510,365 B2 * | 3/2009 | Babiarz | | 414/725 |
| 7,654,478 B1 * | 2/2010 | Lehmann | | 241/24.14 |
| 7,753,157 B1 * | 7/2010 | Woods | | 180/205.6 |
| 8,371,791 B2 * | 2/2013 | Kenna | | 414/111 |
| 2003/0154690 A1 * | 8/2003 | Cullen | | 53/436 |
| 2004/0065060 A1 * | 4/2004 | Cullen | | 53/527 |
| 2004/0261388 A1 * | 12/2004 | Scherer | | 56/16.4 R |
| 2006/0065323 A1 * | 3/2006 | Koelker | | 141/114 |
| 2006/0180238 A1 * | 8/2006 | Koelker | | A01F 25/183 141/114 |
| 2009/0218154 A1 * | 9/2009 | Yee | | 180/220 |
| 2009/0263223 A1 * | 10/2009 | Twiestmeyer et al. | | 414/584 |
| 2012/0132316 A1 * | 5/2012 | Nielsen | | 141/10 |
| 2014/0230961 A1 * | 8/2014 | Hadad | | 141/114 |

FOREIGN PATENT DOCUMENTS

| | | | | |
|---|---|---|---|---|
| EP | 1882406 | | 1/2008 | |
| EP | 1882406 A1 * | | 1/2008 | A01D 43/063 |
| NL | 9400443 | | 4/1995 | |

\* cited by examiner

BAGGING MACHINE SUITABLE FOR ALL TYPES OF DRY AND WET GRAIN

CROSS REFERENCE TO RELATED APPLICATION

This application is a national stage entry of PCT/EC2012/000020 filed Mar. 23, 2012, under the International Convention claiming priority over Argentinean Patent Application No. 20110103502 filed Sep. 26, 2011.

TECHNICAL FIELD OF THE INVENTION

The present invention refers to a bagging machine used in the field of agricultural machinery having the purpose of storing "in situ" all kinds of wet and dry grains in an efficient and safe manner.

BACKGROUND OF THE INVENTION

Currently, various forms of silage methodologies are known for the purpose of bagging a continuous flow of dry grains. These methodologies solve the problems of agricultural companies of grain storage that do not own storage facilities, allowing these companies to store their grains on their own fields, to identify the quality of the product, and to manage the delivery of the grain. These machines have for the bagging horizontal augers with interchangeable jackets that allow the bags to be filled through a containing box that allows the possibility of working with 9-foot bags to realize the corresponding work, placing the bags on sliding trays. The trays are actioned by cardan bars with the required horsepower HP, with double acting hydraulic cylinders.

Another proposal developed a methodology including a product entry system for silage, with the placement of a bag with a lid, activated by means of a winch and a bell-brake centralized command.

Prior art also includes Argentinean Publication AR 0055135 A4 (P 06 0103689) belonging to the same inventors, which discloses a bagging machine suitable for all types of wet or dry grains including collecting box with a curved profile formed by a cover and two sides. Over the top portion of the cover there is a discharging neck of a grain receptor hopper that afterwards discharges into a containing box equipped with a foldable plastic film tube, all of the aforementioned elements are mounted on a chassis with a running gear and a towing shaft. The collecting box includes a closing and support frontal vertical plate for the cereal that channels the grain flow towards the front, in order to facilitate the entry of the grain to the containing box. This containing box is placed under the vertical projection of the aforementioned hopper's opening. The chassis includes a posterior single-axis running gear and a minor, directional front running gear. The posterior running gear is equipped with a regulating brake system, wherein the main characteristics includes an even number of augers, of opposite turns, parallel axis, horizontal, longitudinal with respect to the machine, and symmetrical location with respect to a vertical longitudinal plane that runs through the center of the hopper's neck, separated between themselves at a distance greater than the width of the hopper's neck, considering this width in the same direction of the machine, wherein the distance between the augers is defined with respect to the ideal cylindrical surfaces of each auger and the even number of augers are externally controlled by at least one moto-reduction mechanism associated to a transmission.

The inventors have continued to improve the machine described in the preceding paragraph; solving problems that occurred during real operation of the machine. Swinging and unbalancing generated by unexpected forces in different directions in the structure and the undercarriage of the machinery, while it was operated under different loads and grain flow.

SUMMARY OF THE INVENTION

Confronted with the problems previously mentioned and for solving them, the solution provided is maintaining the machinery operating under a balanced load, according to the workload received controlling the speed, the direction, and the effort distributed to all the structure of the machinery with the object of optimizing the bagging of dry and wet grains. This was accomplished by including into the machine two plates, a frontal vertical plate that closes the grain containing box and in its longitudinal middle section there solidly connected is another plate at an angle of 45 degrees, projected towards the front and welded in an integral way to the structure of the machine. This plate serves as a support to the cereal and provides less sliding of the cereal grains towards the containing box, producing less flow pressure, giving rigidity to the bagging and less friction. Also, this solution offers greater safety in the movement of the machinery when it is loaded with more weight over the frontal directional axis, thus obtaining the required rigidity for steering. This situation, in the prior art, was a difficulty because when the machinery advanced forward and the weight would accumulate in the back, the frontal directional axis would elevate and the machine would tread upwards and backwards.

Another innovation was the addition of an internal hydraulic-mechanical brake that allows a more controlled movement of the machinery with respect to the cereal grain load received by the machinery, with a light displacement of the machinery, in which act simultaneously on both tires of the posterior axis (running gear), by means of a hydraulic command producing the technical effect of a unified braking system for both tires, receiving or releasing hydraulic fluid when the machinery is in operational mode. With this, a forward movement that accommodates to the speed of the grain load was accomplished and the degree of compaction required with an optimal translation direction.

The Object of the Invention

The purpose of the invention is achieved through an "in situ" bagging machine suitable for all types of dry or wet grains, without the need to transport the grain to a collection and storage center, which includes additional technical characteristics to those presented in Argentinian Patent Application AR 0055135 A4 (P 06 0103689), achieving a better and more uniform bagging with an optimal directional movement of the machine.

BRIEF DESCRIPTION OF THE DRAWINGS

In order to make the current patent application more understandable, the application has been illustrated by three schematic drawings, which summarize an illustrative example for better clarity and understanding of the invention.

DETAILED DESCRIPTION OF THE INVENTION

Figure 1:
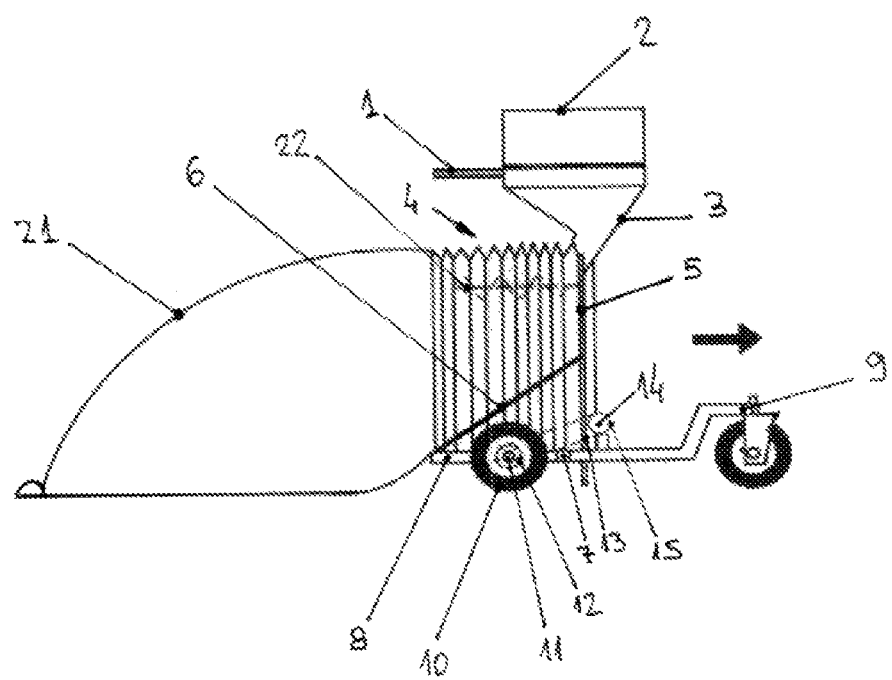
FIG. 1, shows a side view of the object to be protected.
Figure 2:
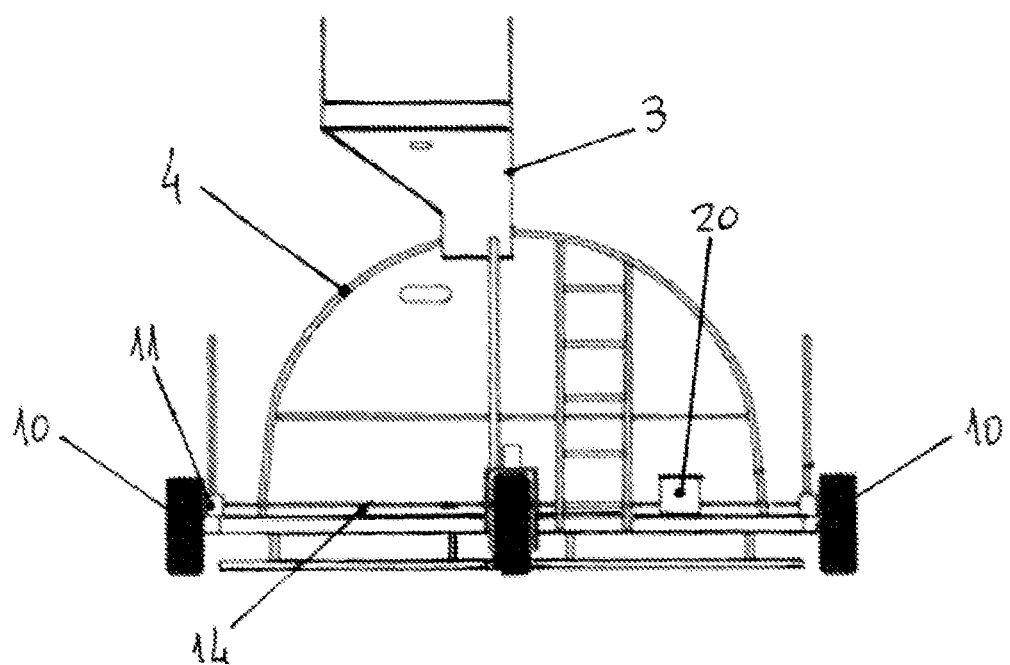
FIG. 2, shows a frontal view of the object to be protected.
Figure 3:
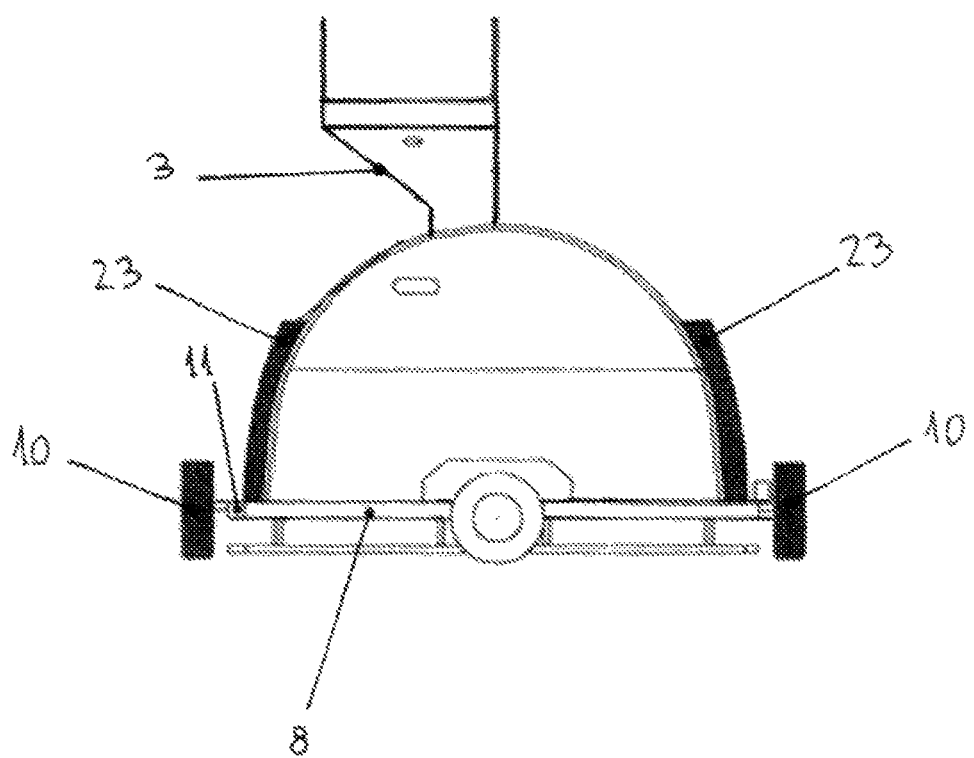
FIG. 3, shows a rear view of the object to be protected.
Figure 4:
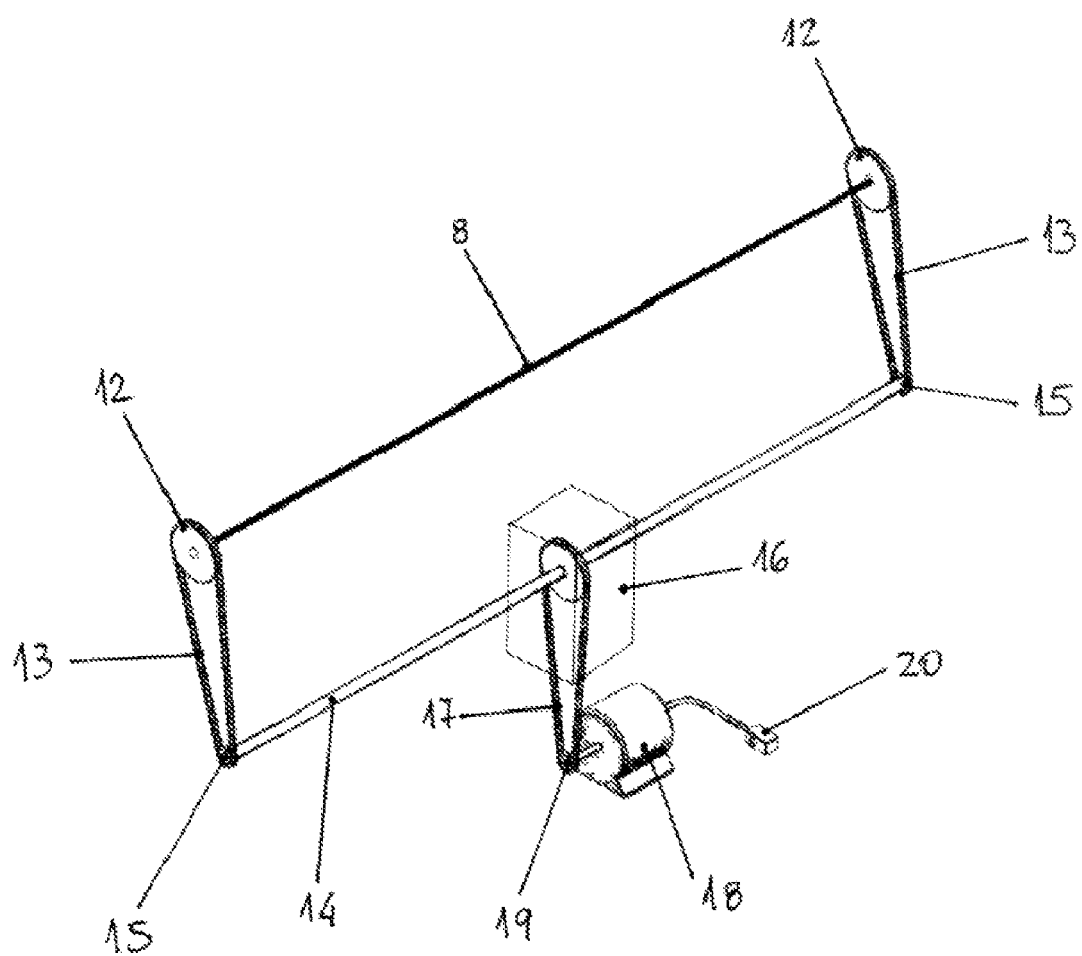
FIGS. 4 and 5, show the brake mechanism, reflecting the hydraulic-mechanical transmission media.
Figure 5:
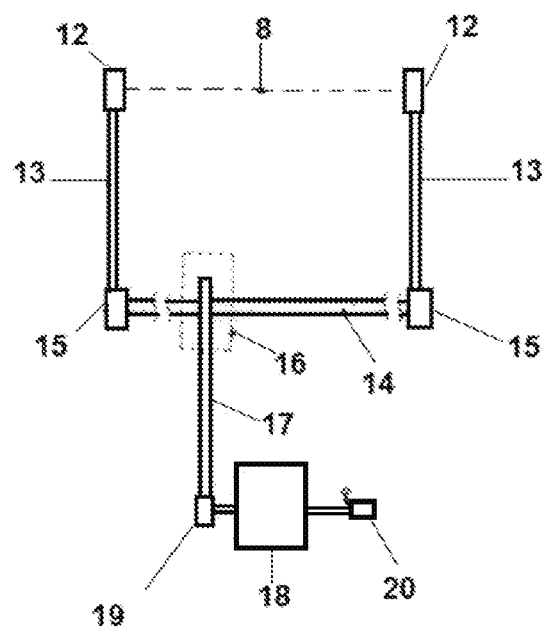
Figure 6:
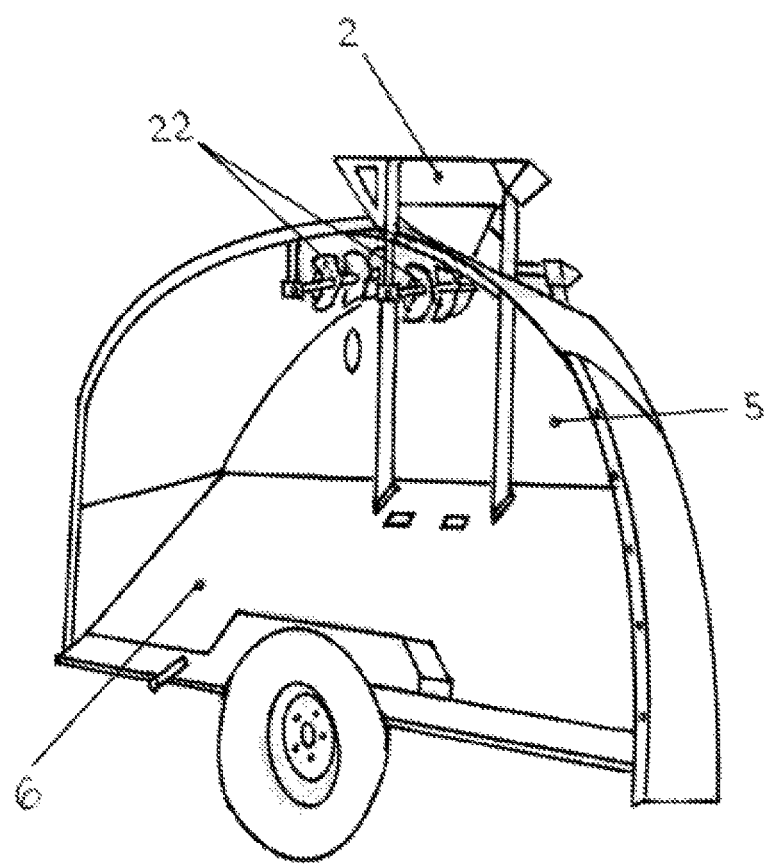
FIG. 6 shows a cross sectional view of the inside of the containing box including the augers, a first vertical plate, and a second plate.

The following list contains the different components of the invention. Each component has been identified with a number that is used in the different drawings of the patent application.
1. Arm used for attaching the winch.
2. Retractable hopper lid. This lid facilitates the filling operation, as well as the transportation of the grain when the lid is closed.
3. Hopper neck.
4. Container box.
5. Vertical metal plate for closure of the container box.
6. 45° inclined metal plate, welded to the vertical metal plate.
7. Chassis.
8. Back axis with a running gear.
9. Front directional running gear.
10. Wheels.
11. Single axis.
12. Crown gear.
13. Transmission chain.
14. Command bar.
15. Gears mounted on the ends of the command bar.
16. Clutch device.
17. Transmission chain.
18. Hydraulic motor.
19. Gear coupled to the hydraulic motor shaft.
20. Operating and control mechanism of the hydraulic motor.
21. Silage bag.
22. Paired augers.
23. Bag contention flaps.

Once the field has been prepared, where the silage bag is to be placed, the machinery is positioned. Once the machinery has been conditioned, the silage bag is placed in its proper position through the use of a hanger that is moved by the winch that is attached to the arm and held by a surrounded harness.

The work principle behind the invention is as follows. The grain is harvested and transported to the bagging machine in a trailer. Through the use of a grain elevator, the grain is entered into the receiving hopper. The grain passes through the hopper neck that has an inclination that is controlled in order to optimize the cereal flow. Then, the cereal encounters a pair of augers, of opposite turns, parallel to each other, placed horizontally, in a longitudinal manner with respect to the machinery. The position of the augers is symmetrical with respect to a vertical plane, longitudinal to the machine and passes through the center of the neck of the hopper. The augers are distanced from each other at a width that is greater than the width of the hopper neck (this width is measured in the same direction of the machine) and the distance is defined with respect to the ideal cylindrical surface of each auger. These augers work as sweepers (accommodating or scattering the grain into the silage bag). The augers are commanded externally through a reduction box with gears and chains that accomplish the filling of the silage bags and obtain the required pressure in the silage bags; thus, the right stretching of the bags is obtained, thus producing adequate silage, without air, and to maintain the optimal conservation conditions.

The pair of augers are moved by means of an external mechanism comprised of a 9 HP motor that can be either an internal combustion or electric motor transmitting the power and the speed needed to the augers through the use of a reduction device with an external command mechanism, of greater impulse and speed to the grain entering the silage bags, achieving the filling of the bags to their maximum capacity.

Both plates, the frontal plate and the 45 degree inclined plate, are placed with an inclination that facilitates the entry of the cereal achieving the proper sliding of the grain and the impulse of the cereal towards the frontal plate. The device moves in the direction indicated with the arrow in FIG. 1.

Because the machine is a simple mechanism, it does not present difficulty in its operation, thus in order to achieve an efficient operation includes an even number of augers. The conditions of the cereal are varied and they present greater problems when the cereal has a high percentage of humidity.

With the forced gravity system that the invention proposes, the machinery does not offer any difficulty in any type of cereal that is to be bagged.

In order to inspect the proper functioning of the machinery, the invention contains inspection windows in the hopper and in the frontal plate.

The grain containing box includes in its interior a combination of two plates: a vertical frontal plate that acts as a closure for the containing box; and, in its longitudinal middle section, a second plate solidly connected to the front plate halfway along the length of, inclined at 45 degree angle, projecting forward and integrally welded to the structure of the machine, to facilitate the entry of the grain to the containing box. The running gear includes a back axle with a single shaft connected at the end thereof to pair of wheels and at least one crown gear. This crown gear is linked by means of a transmission chain to at least one gear mounted at the ends of a command bar of an integral clutching device linked by another transmission chain to a hydraulic motor with the operation and control mechanism.

In general terms, the present invention provides an improved forced-gravity grain flow silage bagging machine.

Also, on both sides of the machine, two side flaps (23) are screwed to the containing box in its end section by means of self-perforating bolts. The side flaps channel the grain flow towards the containing box (one on the right and one on the left). These flaps are supported on the outer part by two brackets properly located on the chassis.

The side flaps (23) retain the cereal to avoid the grains to flow to the sides, thus preventing the rupture of the silage bags.

Having described and determined the nature of the invention and the way in which the invention can be used in practice in its fundamental idea, we claim as an invention of exclusive property the following:

1. A bagging machine for dry and wet grains comprising:
   a containing box including an interior section, an upper cover, a first end, a second end, a top end, a bottom end, a first side, and a second side, an opening located at the top end and near the first end, the first side and the second side are made of a retractable tube;
   a receiving hopper located above the top end of the container box, the receiving hopper having a neck located on a lower end of the receiving hopper, the neck is inclined from the lower end of the receiving hopper towards an output exit located on the opposite end of the lower end of the receiving hopper, the output exit is connected to the opening of the containing box, the output exit that transports the grains through the opening towards the inside of the containing box;

a first auger and a second auger enclosed inside the interior section of the containing box, the first and second auger turn in opposite directions, are parallel to each other, and are placed horizontally with regards to the containing box;

a first vertical plate located at the first end of the containing box and near the output exit of the receiving hopper, the first vertical plate closes the first end of the containing box;

a second plate located inside the interior section of the containing box, the second plate includes a first end connected at an angle to a longitudinal middle section of the first vertical plate and a second end fixed to a movable undercarriage;

each one of the first auger and the second auger having a first end connected to the first vertical plate and near the output exit of the receiving hopper;

the second side of the containing box is adapted to attach to a silo bag; and the movable undercarriage transports the bagging machine.

2. The bagging machine according to claim 1, further including an external motor operatively connected to the augers.

3. The bagging machine according to claim 1, wherein the undercarriage includes a back axle with a single shaft connected at a first end to a pair of wheels and at least one crown gear.

4. The bagging machine according to claim 3, wherein the crown gear is linked through a transmission chain to at least one gear mounted at the ends of a command bar of an integral clutching device.

5. The bagging machine according to claim 1, further including a side flap connected to the first and second sides of the containing box.

6. A bagging machine for dry and wet grains comprising:
a movable undercarriage, the movable undercarriage transports the bagging machine, the movable undercarriage having a front end and a back end;

a front directional running gear attached to the front end of the undercarriage;

a back directional running gear having a back axle including a single shaft connected at a first end to a pair of wheels and at least one crown gear, the crown gear is linked through a transmission chain to at least one gear mounted at the ends of a command bar of an integral clutching device linked by a second transmission chain to a hydraulic motor including an operating and control mechanism;

a containing box including an interior section, an upper cover, a first end, a second end, a top end, a bottom end, a first side, and a second side, an opening located at the top end and near the first end, the first side and the second side are made of a retractable tube;

a receiving hopper located above the top end of the container box, the receiving hopper having a neck located on a lower end of the receiving hopper, the neck is inclined from the lower end of the receiving hopper towards an output exit located on the opposite end of the lower end of the receiving hopper, the output exit is connected to the opening of the containing box the output exit that transports the grains through the opening towards the inside of the containing box;

a first auger and a second auger enclosed inside the interior section of the containing box, the first and second auger turn in opposite directions, are parallel to each other, and are placed horizontally with regards to the containing box;

a first vertical plate located at the first end of the containing box and near the output exit of the receiving hopper, the first vertical plate closes the first end of the containing box;

a second plate located inside the interior section of the containing box, the second plate includes a first end connected at an angle to a longitudinal middle section of the first vertical plate and a second end fixed to a movable undercarriage;

each one of the first auger and the second auger having a first end connected to the first vertical plate and near the output exit of the receiving hopper;

the second side of the containing box is adapted to attach to a silo bag.

7. A bagging machine for dry and wet grains consisting of:
a containing box including an interior section, an upper cover, a first end, a second end, a top end, a bottom end, a first side, and a second side, an opening located at the top end and near the first end, the first side and the second side are made of a retractable tube;

a receiving hopper located above the top end of the container box, the receiving hopper having a neck located on a lower end of the receiving hopper, the neck is inclined from the lower end of the receiving hopper towards an output exit located on the opposite end of the lower end of the receiving hopper, the output exit is connected to the opening of the containing box, the output exit that transports the grains through the opening towards the inside of the containing box;

a first auger and a second auger enclosed inside the interior section of the containing box, the first and second auger turn in opposite directions, are parallel to each other, and are placed horizontally with regards to the containing box;

a first vertical plate located at the first end of the containing box and near the output exit of the receiving hopper, the first vertical plate closes the first end of the containing box;

a second plate located inside the interior section of the containing box, the second plate includes a first end connected at an angle to a longitudinal middle section of the first vertical plate and a second end fixed to a movable undercarriage;

each one of the first auger and the second auger having a first end connected to the first vertical plate and near the output exit of the receiving hopper;

the second side of the containing box is adapted to attach to a silo bag; and the movable undercarriage transports the bagging machine.

* * * * *